US008330620B2

(12) United States Patent
Swoboda et al.

(10) Patent No.: US 8,330,620 B2
(45) Date of Patent: Dec. 11, 2012

(54) METHOD FOR PRODUCING A LOCALIZED WARNING OF DANGEROUS SITUATIONS FOR VEHICLES

(75) Inventors: Adam Swoboda, Groβ Gerau (DE); Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 448 days.

(21) Appl. No.: 12/447,943

(22) PCT Filed: Nov. 1, 2007

(86) PCT No.: PCT/EP2007/061804

§ 371 (c)(1), (2), (4) Date: Oct. 30, 2009

(87) PCT Pub. No.: WO2008/053035

PCT Pub. Date: May 8, 2008

(65) Prior Publication Data

US 2010/0066562 A1 Mar. 18, 2010

(30) Foreign Application Priority Data

Nov. 2, 2006 (DE) ......................... 10 2006 052 180
Nov. 1, 2007 (DE) ......................... 10 2007 052 540

(51) Int. Cl.
*G08G 1/00* (2006.01)
*G06F 19/00* (2006.01)

(52) U.S. Cl. ........ 340/902; 340/903; 340/905; 701/117; 701/400

(58) Field of Classification Search .................. 340/902, 340/905
See application file for complete search history.

(56) References Cited

U.S. PATENT DOCUMENTS

| | | | | |
|---|---|---|---|---|
| 5,900,825 | A * | 5/1999 | Pressel et al. | 340/905 |
| 6,012,012 | A | 1/2000 | Fleck et al. | |
| 6,147,600 | A | 11/2000 | Faye | |
| 6,351,709 | B2 * | 2/2002 | King et al. | 701/210 |
| 6,529,831 | B1 | 3/2003 | Smith et al. | |
| 6,791,471 | B2 * | 9/2004 | Wehner et al. | 340/903 |
| 6,943,701 | B2 * | 9/2005 | Zeineh | 340/988 |
| 7,113,107 | B2 * | 9/2006 | Taylor | 340/901 |
| 7,191,058 | B2 * | 3/2007 | Laird et al. | 701/204 |
| 2002/0105423 | A1 | 8/2002 | Rast | |
| 2006/0229812 | A1 | 10/2006 | Eckstein et al. | |
| 2007/0262880 | A1 | 11/2007 | Curtis | |

FOREIGN PATENT DOCUMENTS

| | | |
|---|---|---|
| DE | 91 08 827.5 | 11/1991 |
| DE | 42 31 456 | 3/1994 |
| DE | 43 42 856 C1 | 3/1995 |
| DE | 196 04 084 | 10/1996 |
| DE | 197 03 563 | 8/1998 |
| DE | 198 14 574 A1 | 10/1999 |

(Continued)

*Primary Examiner* — Donnie Crosland
(74) *Attorney, Agent, or Firm* — RatnerPrestia

(57) ABSTRACT

A method for issuing warnings in vehicles about hazardous situations as a function of their location. A position of the first vehicle is transmitted as first information and actuated warning signal of the first vehicle are transmitted as second information to surrounding vehicles. The information is received by the surrounding vehicles and the first information is compared and evaluated with information relating to a position of the surrounding vehicles. In the event of a hazardous situation for the surrounding vehicles, corresponding measures for minimizing the hazardous situations are initiated in the surrounding vehicles.

6 Claims, 2 Drawing Sheets

FOREIGN PATENT DOCUMENTS

| | | |
|---|---|---|
| DE | 100 05 867 | 8/2001 |
| DE | 201 11 678 | 11/2001 |
| DE | 102 41 134 | 3/2004 |
| DE | 10 2005 055 208 | 2/2007 |
| EP | 09 82 697 | 3/2000 |
| EP | 1 713 035 | 10/2006 |
| WO | WO 2007/047476 | 4/2007 |

* cited by examiner

METHOD FOR PRODUCING A LOCALIZED WARNING OF DANGEROUS SITUATIONS FOR VEHICLES

CROSS REFERENCE TO RELATED APPLICATIONS

This application is the U.S. national phase application of PCT International Application No. PCT/EP2007/061804, filed Nov. 1, 2007, which claims priority to German Patent Application No. DE102006052180.3, filed Nov. 2, 2006 and German Patent Application No. DE102007052540.2, filed Nov. 1, 2007, the contents of such applications being incorporated by reference herein.

BACKGROUND OF THE INVENTION

1. Field of the Invention

The invention relates to a method for issuing warnings in vehicles about hazardous situations as a function of the location.

2. Description of the Related Art

German utility model GM 91 08 827 presents a signal emission device for controlling the braking light in a motor vehicle in which, in order to detect a sudden decrease in the acceleration of the vehicle, the position of the accelerator pedal which is activated by the driver of the vehicle is evaluated. Moderate release of the accelerator pedal, which occurs under normal conditions, does not in this context trigger any actuation of the brake lights, while if the accelerator pedal is released abruptly, as occurs directly before an emergency braking, the brake lights are actuated. In this context, the selection of the change in the position of accelerator pedal during which actuation of the brake light takes place, always forms a compromise between avoiding unnecessary actuation of the brake lights in the case in which the change in the accelerator pedal is not followed by emergency braking, and the necessary actuation of the brake lights in the case in which the change in the accelerator pedal is followed by emergency braking.

DE 19814574 discloses a method for generating a signal for actuating the brake lights of a motor vehicle. In the method, the accelerator pedal change variable which represents the change over time in the position of an accelerator pedal which can be actuated by the driver of the vehicle is detected, and the detected accelerator pedal change variable is compared with at least one predefinable threshold value, and the signal is generated as a function of the comparison, wherein the threshold value is predefined as a function of at least one stability/safety variable which represents the instantaneous driving stability of the vehicle and/or instantaneous driving safety of the vehicle.

DE 4342856 discloses a circuit for a flashing hazard warning system of a motor vehicle which is equipped with an antilock brake system. When an antilock brake system control process is triggered, a flashing hazard warning system is activated.

DE 10005867 discloses a hazard warning system which is equipped with electronic circuits and with sensors and which senses the movement of the driver's own vehicle and also the traffic events behind the driver's own vehicle and identifies situations with a hazard potential by comparison and evaluation of this information, and outputs warning signals.

The activation of the hazard warning system serves primarily to issue a warning that a vehicle is entering or is in a possible hazardous situation. The surrounding vehicles can determine that a possible hazardous situation may occur only on the basis of visual recording but cannot determine whether this hazardous situation is relevant to the driver's own vehicle.

SUMMARY OF THE INVENTION

The invention relates to an object of permitting a situation-dependent exchange of information between at least two vehicles to be brought about in a simple and quick fashion in order to reduce hazardous situations.

An advantage of the invention is the simple and efficient implementation of the outputting of individualized warnings to the greatest possible number of vehicles which are involved in the road traffic, in order to detect potential hazardous locations and to minimize hazardous situations. Furthermore, the information content of the transmitted message, which is firstly perceived as a "conventional" warning by the vehicles in the surroundings, is advantageously expanded and evaluated, in which case generates by logically combining various signals to form an added value. It is advantageous that as a result of the method according to aspects of the invention the previous need to carry along a warning sign in a vehicle is required less often and the risk when positioning and installing a warning sign for a person is reduced or does not occur at all anymore. This is particularly advantageous on roads with heavy and fast traffic where there is a high risk of an accident.

The method according to aspects of the invention is particularly advantageous for issuing warnings in vehicles about hazardous situations as a function of the location, wherein the respective vehicles which are involved in the method have means for exchanging information, means for outputting warning signals and means for determining their own location coordinates and driver assistance and vehicle safety systems, and in which the following steps are carried out:

a) the means for outputting warning signals in a first vehicle is activated b) via the means for exchanging information, the position of the first transmitting vehicle is transmitted as first information and the actuated warning signal is transmitted as second information to the surrounding vehicles c) in at least one further vehicle, the information is received via the means for exchanging information d) the first information is compared with further information relating to the position of the further vehicle and evaluated e) in the event of a hazardous situation for the vehicles which are in the surroundings, corresponding measures for minimizing the hazardous situation are initiated by means of the driver assistance and vehicle safety systems in the respective receiving vehicles.

In one advantageous refinement, before the information is transmitted, the warning signal is monitored over a specific time period and a transmission is not made by the means for exchanging information until the velocity of the transmitting vehicle drops below a specific threshold, for example 5 km/h.

One particularly advantageous refinement of the method according to aspects of the invention is characterized by the verification of the plausibility of the warning signal, during which the information of a vehicle data bus is used for checking.

One particularly advantageous refinement of the method is carried out in that when a stationary state of the transmitting vehicle is detected, it is checked whether the drive unit and/or the tires is/are functional, and if the drive unit and/or the tires is/are not functional this is transmitted to the vehicles in the surroundings via the means for exchanging information.

In one advantageous refinement, in the transmitting vehicle which outputs the warning signal, the status of all the access devices is checked.

The refinement of the method according to aspects of the invention as a result of which in the receiving vehicle which outputs the warning signal, a warning sign has been removed from its mount when in the transmitting vehicle is particularly advantageous.

Exemplary embodiments of the invention are described in more detail below.

BRIEF DESCRIPTION OF THE DRAWINGS

The invention is best understood from the following detailed description when read in connection with the accompanying drawing. Included in the drawing is the following figure.

DETAILED DESCRIPTION OF THE PREFERRED EMBODIMENTS

Figure 1:
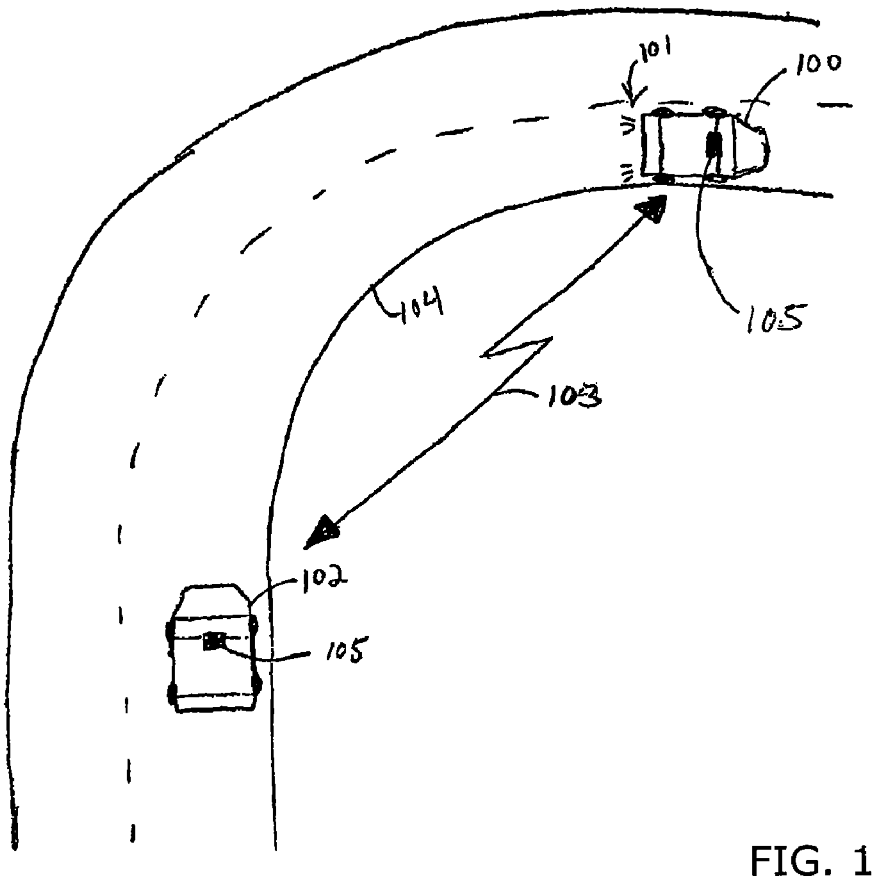
FIG. 1 is a view of vehicle to vehicle communication, according to an embodiment of the present invention.

In the text which follows, the formation of a communications link for warning about potential hazardous locations is presented as an embodiment. According to aspects of the invention, a first vehicle 100 on road 104 transmits that the flashing hazardous warning light 101 is switched on via a vehicle-to-vehicle or vehicle-infrastructure communication 103. In addition, the position of the vehicle 100 is transmitted. This information is displayed on telematics unit 105 in a second vehicle 102 via the abovementioned communication if the first vehicle is at a location which is relevant for the second vehicle. This relevant location is determined, for example, by map data or navigation/routing means, and its plausibility is verified.

Figure 2:
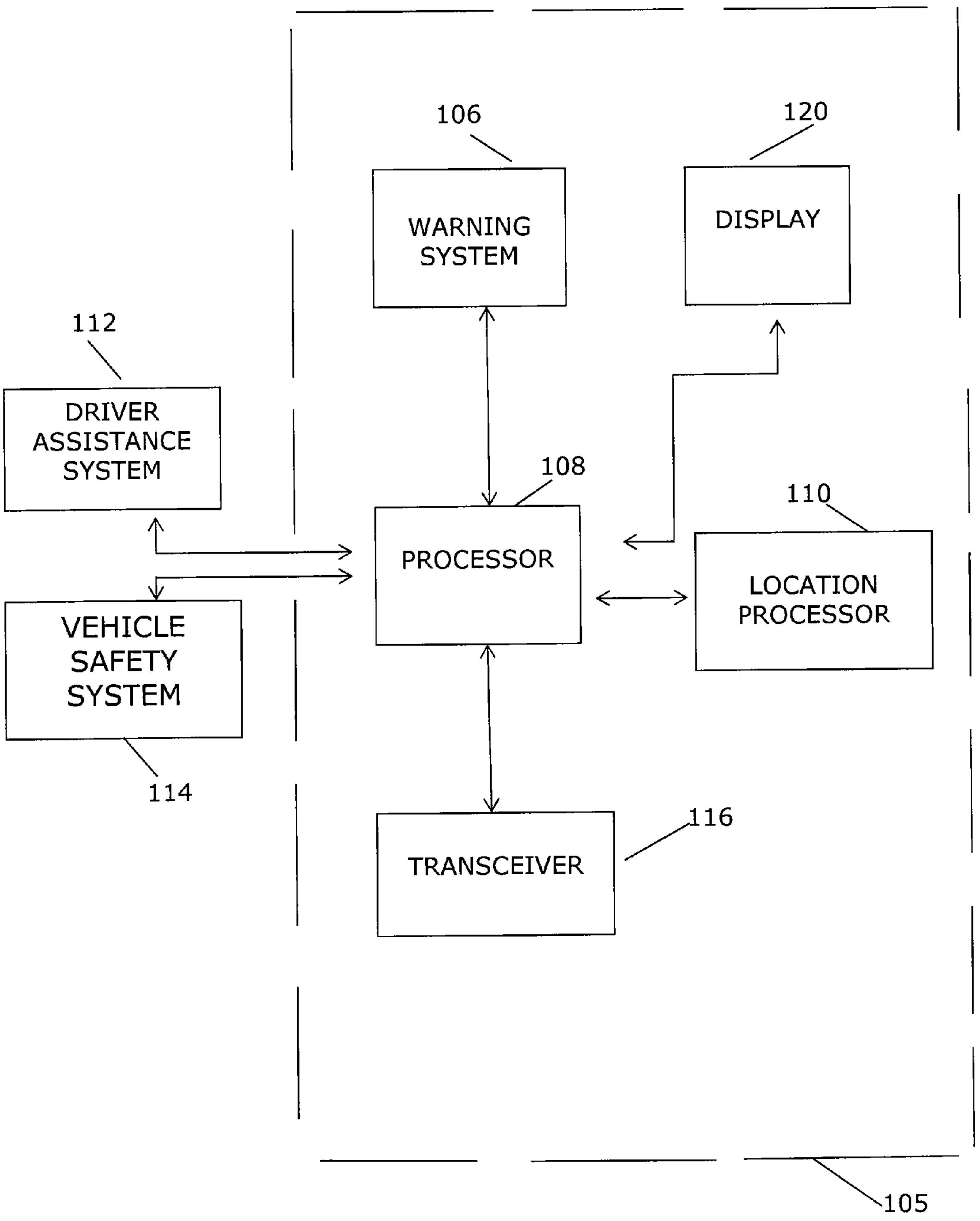
FIG. 2 is a view of telematics unit for the vehicles, according to an embodiment of the present invention.

In one embodiment, shown in FIG. 2, telematics unit 105 includes warning system 106 for outputting warning signals, display 120 for displaying information, location processor 110 for computing the location of the vehicle, transceiver 116 for transmitting an receiving information and processor 108 for processing information. Telematics unit 105 is configured to communicate with driver assistance system 112 and vehicle safety system 114 of the vehicle.

A warning is therefore issued in the vehicle a long distance before a bend which cannot be seen into if the information is relevant information which is checked on the basis of the transmitted location information of the transmitting vehicle to determine whether the vehicle is in the stationary state, for example. At the same time, a warning sign appears on a playback unit such as a cockpit display or head-up display.

In the receiving vehicle, the warning is transmitted to the driver assistance and vehicle safety system. All brake systems which are available in the vehicle with electronic closed-loop control can be used as vehicle safety systems. Vehicle safety systems can be the electronic brake system (EBS), the engine management system (EMS), anti-block brake system (ABS), traction control system (TCS), electronic stability program (ESP), electronic differential lock (EDL), transmission control unit (TCU), electronic braking force distribution system (EBFS) and/or engine drag torque controller (EDTC). Driver assistance systems are electronic auxiliary devices in vehicles for assisting the driver in specific driving situations. The emphasis here is often on safety aspects, but also on increasing the driving comfort. These systems intervene in a partially autonomous or autonomous fashion in the drive, control system (for example throttle, brake) or signaling devices of the vehicle or warn the driver just before or during critical situations by means of suitable man/machine interfaces. Such driver assistance systems are, for example, a parking aid (sensor arrays for detecting obstacles and distances), braking assistant (BS), cruise controller, adaptive cruise controller (ACC), inter-vehicle distance warning system, turning off assistant, traffic jam assistant, lane detection system, lane keeping system/lane assistant (lane departure warning (LDW) system), lane keeping support, lane change assistant, lane change support, intelligent speed adaptation (ISA), adaptive bend light, tire pressure control system, driver state detection system, road sign detection system, platooning, backed up traffic assistant, automatic emergency braking (AEB), dipped headlight and full beam headlight assistant, night vision system.

The visual and acoustic messages are supplemented by a signal of the force feedback accelerator pedal which can be sensed intuitively and which is issued to the driver by means of a driver assistance system. Using pressure, it is obvious to the driver to throttle speed. This triggering of the force feedback accelerator pedal is therefore initiated by a defective vehicle which is no longer roadworthy if, when the flashing hazard warning light is activated, additional information such as meta information from the transmitting vehicle is checked, for which reason the flashing hazard warning light has been switched on. Parallel to the flashing hazard warning system, a warning signal is transmitted to the telematics units of the other vehicles in the surrounding area of several hundred meters via the communication means such as a telematics module using broadband communications technology DSRC (dedicated short range communication) and/or WLAN (wireless local area network) transmission. As a result of this communication, the drivers have sufficient time to throttle back the speed and approach the hazardous location carefully.

In a second embodiment, additionally information is added to the flashing hazard warning light function and, according to aspects of the invention, a situation analysis is carried out over a short time period for the vehicle issuing the warning signal. If it is determined that the vehicle is stationary and no further meta information is transmitted, as a result of which all four wheels are not found to be moving over a period which can be specified, this is interpreted as being a parking situation, for example in a second row. If the vehicle continues to travel slowly and the flashing hazard warning light function continues to be active, the potential end of a traffic jam is detected as a result of the received information.

Furthermore, if the transmitting vehicle has stopped and therefore "the vehicle cannot suddenly continue moving", as is the case when the vehicle is parked in a second row or when the end of a traffic jam is encountered, verification of plausibility is carried out to determine that the transmitting vehicle is stationary and can no longer continue moving independently, by using its own drive unit, by means of technically determined additional information in that it is detected, for example, whether the warning triangle has been removed from its mount, the information of the fuel tank display or the sensor in the fuel tank is checked or whether the engine hood is opened. Furthermore, all the information relating to the engine is read out via a data link, for example the CAN bus. Alternatively, the diagnostic data which is issued on a diagnostic plug is used to evaluate the status of the vehicle. In addition to the information which is representative of the operation of the drive train, various technical means are used to check whether a tire is no longer suitable for operation, such as for example if the tire "no longer has any air".

The vehicle is actively presenting a hazard for others if, for example, gasoline is running out. This is detected by the fuel tank level sensor. If smoke is produced, a hazardous situation is also to be assumed, in which case a smoke detection system in the vehicle is used. When the temperature sensors are used, a hazardous situation is present if the temperature rises very quickly over a certain time period and the vehicle can catch fire. A hazardous situation is also present if, for example, a tire bursts or is removed. These hazardous situations are detected by a tire pressure monitoring system. If the vehicle is a transporter for hazardous goods, the urgency of the warning is increased since in combination with the messages above the risk is greater.

In a further embodiment, the information about the closed or opened access device to the vehicle is additionally monitored and used for verifying the plausibility. Access devices are to be understood as all entry possibilities such as doors, flaps, hoods and covers which permit a person to enter the interior of the vehicle. It is checked, for example, whether a door or the trunk is opened. If, for example, a door is opened and the flashing hazard warning light is active, it is concluded that there is a risk of persons being located on the highway and the area in which the vehicle is located is to be given a higher classification for the potential hazard as a result of further hazardous objects which cannot be seen, for example pedestrians on the roadway.

This additional information is also displayed to the driver of the second vehicle if the information is classified as being relevant as a result of situation analysis by his own vehicle.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for issuing warnings in vehicles about hazardous situations as a function of their location, wherein the respective vehicles which are involved in the method include means for exchanging information, means for outputting warning signals, means for determining their own location coordinates, driver assistance systems and vehicle safety systems, said method comprising the steps of:

a) activating the means for outputting warning signals in a first vehicle;

b) transmitting a position of the first vehicle via the means for exchanging information as first information and transmitting an actuated warning signal to the surrounding vehicles as second information;

c) receiving the first and second information in at least one further vehicle via the means for exchanging information;

d) comparing and evaluating the first information received in step (c) with further information relating to the position of the further vehicle; and e) initiating measures for minimizing a hazardous situation in the event of a hazardous situation for the vehicles which are in the surroundings by means of the driver assistance and vehicle safety systems in the respective receiving vehicles, and wherein before the information is transmitted, the warning signal is monitored over a specific time period and a transmission is not made by the means for exchanging information until a velocity of the transmitting vehicle drops below a specific threshold and the transmission takes place as a broadcast transmission, a multicast transmission, a unicast transmission, or any combination thereof.

2. The method as claimed in claim 1, wherein the information of a vehicle data bus is checked to verify a plausibility of the warning signal.

3. The method as claimed in claim 1, wherein upon detecting a stationary state of the transmitting vehicle, a functionality of at least one of the drive unit and the tires of the transmitting vehicle is evaluated, and if at least one of the drive unit or the tires of the transmitting vehicle is non-functional, information relating to the non-functional status of the transmitting vehicle is transmitted to vehicles in the surroundings via the means for exchanging information.

4. The method as claimed in claim 1, wherein in the transmitting vehicle which outputs a warning signal, a status of doors, a trunk or a hood of the transmitting vehicle is monitored and information relating to the status of the doors, the trunk and/or the hood is transmitted to the vehicles in the surroundings.

5. The method as claimed in claim 4, wherein in the receiving vehicle which outputs a warning signal, information relating to the status of the doors, the trunk and/or the hood of the transmitting vehicle is checked.

6. The method as claimed in claim 1, wherein upon removing a warning triangle from the transmitting vehicle, information relating to the status of the warning triangle is transmitted to the vehicles in the surroundings.

* * * * *